(12) United States Patent
Schager et al.

(10) Patent No.: US 11,830,106 B2
(45) Date of Patent: Nov. 28, 2023

(54) PROCEDURAL PATTERN GENERATION FOR LAYERED TWO-DIMENSIONAL AUGMENTED REALITY EFFECTS

(71) Applicant: Lemon Inc., Grand Cayman (KY)

(72) Inventors: Nathan Schager, Los Angeles, CA (US); Yixin Zhao, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/531,462

(22) Filed: Nov. 19, 2021

(65) Prior Publication Data
US 2023/0162408 A1  May 25, 2023

(51) Int. Cl.
G06T 11/00 (2006.01)
G06T 7/12 (2017.01)
(52) U.S. Cl.
CPC ............ G06T 11/00 (2013.01); G06T 7/12 (2017.01); G06T 2207/10016 (2013.01); G06T 2207/30196 (2013.01)
(58) Field of Classification Search
None
See application file for complete search history.

(56) References Cited

U.S. PATENT DOCUMENTS

| | | | | |
|---|---|---|---|---|
| 5,225,824 A * | 7/1993 | Yamamoto | ............ | H04N 5/262 348/E5.051 |
| 2013/0182072 A1 * | 7/2013 | Seo | ............ | H04N 13/302 348/739 |
| 2014/0292753 A1 * | 10/2014 | Bi | ............ | G06T 15/00 345/420 |
| 2020/0098114 A1 | 3/2020 | Kudriashov et al. | | |
| 2020/0175736 A1 | 6/2020 | Jia et al. | | |
| 2020/0234508 A1 | 7/2020 | Shaburov et al. | | |
| 2021/0065454 A1 * | 3/2021 | Goodrich | ............ | G06T 7/194 |

(Continued)

FOREIGN PATENT DOCUMENTS

WO  2021008166 A1  1/2021

OTHER PUBLICATIONS

International Search Report dated Jun. 19, 2023 for International Application No. PCT/SG2022/050796.

(Continued)

*Primary Examiner* — Kyle Zhai
(74) *Attorney, Agent, or Firm* — Faegre Drinker Biddle & Reath LLP

(57) ABSTRACT

Methods, systems and storage media for applying a pattern application effect to one or more frames of video are disclosed. Some examples may include: obtaining video data including one or more video frames, determining one or more segments in each of the one or more video frames, determining one or more object masks based on the one or more segments in each of the one or more video frames, combining, the one or more object masks into a single mask, obtaining pattern information, the pattern information representing one or more graphical effects to be applied to at least one layer of the one or more video frames, applying the pattern information to the single mask to generate masked pattern information and generating, by the computing device, a rendered video by adding the masked pattern information to the one or more video frames.

19 Claims, 9 Drawing Sheets

(56) References Cited

U.S. PATENT DOCUMENTS

2021/0314498 A1 10/2021 Shaburov et al.

OTHER PUBLICATIONS

Spark AR, Bunny Mask With Animated 3D Objects. Apr. 29, 2021[Retrieved on Jun. 15, 2023 from https://web.archive.org/web/20210429065313/https://sparkar.facebook.com/arstudio/learn/tutorials/bunny-mask#getting-started] Whole article.

Spark AR, Utility Patches Overview. Jul. 27, 2021 [Retrieved on Jun. 15, 2023 from https://web.archive.org/web/20210727151949/https://sparkar.facebook.com/arstudio/learn/patch-editor/utility-patches/] Available Utility Patches—Random.

Spark AR, Patch Editor: Creating Patterns with SDF Patches. Apr. 22, 2021 [Retrieved on Jun. 15, 2023 from https://web.archive.org/web/20210422235106/https://sparkar.facebook.com/arstudio/learn/tutorials/creating-patterns-with-sdf-patches] Whole article.

* cited by examiner

PROCEDURAL PATTERN GENERATION FOR LAYERED TWO-DIMENSIONAL AUGMENTED REALITY EFFECTS

BACKGROUND

Video editing techniques are widely available to provide users various ways to edit videos. For example, users may edit a video to add a pattern application effect to the video. However, many of the video editing techniques do not allow a user to add generated patterns and/or control the patterns that are generated with respect to the interaction of the patterns and the video. A pattern application effect may mimic magical transformation sequences commonly found in anime cartoons. While rendered animation sequences may be added to a video, either a live video or recorded video, such animation sequences may require extensive amounts of storage and memory space thereby limiting the diversity of the content that can be displayed or otherwise included in the video. Hence, there remains a need to develop video editing techniques for rendering generated patterns or otherwise control pattern application effects to enhance user experiences.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

In accordance with at least one example of the present disclosure, at least one aspect relates to a method for applying a pattern application effect to one or more frames of video. The method may include obtaining, by a computing device, video data including one or more video frames. The method may include determining, by the computing device, one or more segments in each of the one or more video frames. The method may include determining, by the computing device, one or more object masks based on the one or more segments in each of the one or more video frames. The method may include combining, by the computing device, the one or more object masks into a single mask, the single masking representing the one or more object masks. The method may include obtaining pattern information, the pattern information representing one or more graphical effects to be applied to at least one layer of the one or more video frames. The method may include applying the pattern information to the single mask to generate masked pattern information. The method may include generating, by the computing device, a rendered video by adding the masked pattern information to the one or more video frames.

Another aspect of the present disclosure relates to a system for applying a pattern application effect to one or more frames of video. The system may include one or more hardware processors configured by machine-readable instructions for applying a pattern application effect to one or more frames of video. The machine-readable instructions may be configured to obtain, by a computing device, video data including one or more video frames. The machine-readable instructions may be configured to determine, by the computing device, one or more segments in each of the one or more video frames. The machine-readable instructions may be configured to determine, by the computing device, one or more object masks based on the one or more segments in each of the one or more video frames. The machine-readable instructions may be configured to combine, by the computing device, the one or more object masks into a single mask, the single mask representing the one or more object masks. The machine-readable instructions may be configured to obtain pattern information, the pattern information representing one or more graphical effects to be applied to at least one layer of the one or more video frames. The machine-readable instructions may be configured to apply the pattern information to the single mask to generate masked pattern information. The machine-readable instructions may be configured to generate, by the computing device, a rendered video by adding the masked pattern information to the one or more video frames.

Another aspect of the present disclosure relates to a computer-readable storage medium for applying a pattern application effect to one or more frames of video. In some embodiments, the computer-readable storage medium may include instructions being executable by one or more processors to obtain, by a computing device, video data including one or more video frames. In some embodiments, the computer-readable storage medium may include instructions being executable by one or more processors to determine, by the computing device, one or more segments in each of the one or more video frames. In some embodiments, the computer-readable storage medium may include instructions being executable by one or more processors to determine, by the computing device, one or more object masks based on the one or more segments in each of the one or more video frames. In some embodiments, the computer-readable storage medium may include instructions being executable by one or more processors to combine, by the computing device, the one or more object masks into a single mask, the single mask representing the one or more object masks. In some embodiments, the computer-readable storage medium may include instructions being executable by one or more processors to obtain pattern information, the pattern information representing one or more graphical effects to be applied to at least one layer of the one or more video frames. In some embodiments, the computer-readable storage medium may include instructions being executable by one or more processors to apply the pattern information to the single mask to generate masked pattern information. In some embodiments, the computer-readable storage medium may include instructions being executable by one or more processors to generate, by the computing device, a rendered video by adding the masked pattern information to the one or more video frames.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
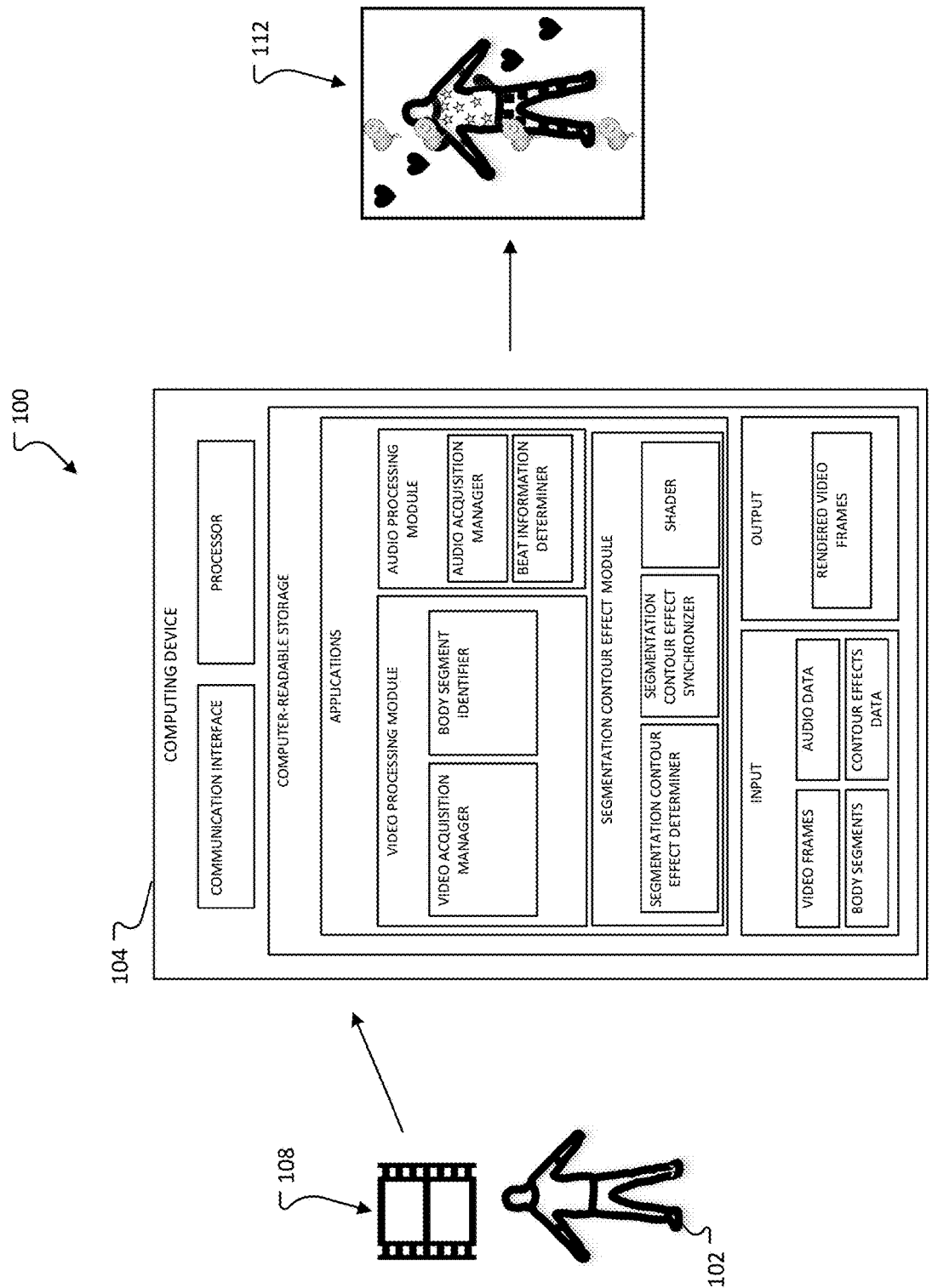
FIG. 1 depicts details of a pattern generation process and synchronization system for generating one or more patterns based on segmented areas in an image or video clip in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a pattern generation process and synchronization system allows a user to apply textual and/or procedurally generated patterns of various two-dimensional graphics to one or more segmented portions of a video image or video clip based on one or more masks, such as a color mask, where the one or more masks may be applied to a target subject in a video clip as well as the background and foreground regions in the video clip. As an example, the pattern application effect may mimic magical transformation sequences commonly found in anime cartoons. Traditional methods for adding content to a video include utilizing pre-rendered animation sequences; while pre-rendered animation sequences may be added to a video, either a live, substantially real-time, or recorded video, such animation sequences may require extensive amounts of storage and memory space thereby limiting the diversity of the content that can be displayed or otherwise included in the video. Accordingly, in examples provided herein, systems and methods utilize texture bombing in several layers to create infinite pseudo-random patterns. The patterns may be selected from a pool of pre-defined shapes and can be tinted with a random color scheme.

As described above, a solution to generate augmented reality backgrounds using procedural generation techniques is described herein. In examples, to generate a pattern layer, where the pattern is generated on a per layer basis, a generated pseudo-random number is processed at a shader such that an appearance of a random pattern is generated. Thus, based on one or more textures, an infinite number of patters can be generated. In accordance with examples of the present disclosure, the generated patterns can be masked by providing textures from various video and/or image segmentation processes. Segmentation masks can be combined into a single mask, such as an RGBA mask, to increase efficiency and ease of use. Accordingly, a portion of the mask (such as a portion associated with an object in the video image or video clip) can be selected in order to apply a generated pattern for a specific layer to the selected portion or layer.

In examples, the generated pattern layers may be arranged to utilize a number of fill background and texture bomber layers in the background (e.g., not the subject of the video or image); a texture bombing layer can be applied to the subject of video or image. In examples, the fill may include a tiled texture; the texture bomber may generate elements that compose or create the generated pattern. The layers may then be combined using an alpha+render order, one after the other, so that each successive layer appears on top of the previous layer. The figure+background may be differentiated by a bitmask that is multiplied against the RGBA subject or body mask to hide parts of the background or subject in the image. Additional information describing texture bombing can be found in Chapter 20 of *GPU Gems: Programming Techniques, Tips and Tricks for Real-Time Graphics*, Pearson Higher Education, Randima Fernando—2004, the contents of which is herein incorporated by reference for all that it teaches and all purposes.

In accordance with examples of the present disclosure, pattern generation code can randomly select a shape and/or color for each new generated pattern. The shapes can include one or more designer-defined assets or procedural shapes pre-defined in the shader or otherwise generated procedurally by the shader. Accordingly, if the assets are formatted correctly, the pattern can have its color scheme set to multiple colors. Thus, the color scheme may configure the background to be cooler, higher value, and more saturated, and the figure to be warmer and less saturated, with brighter values. The color scheme can be randomly generated using the split complimentary method in HSV color space. Accordingly, the use of texture bombing for procedural pattern generation in augmented reality scenarios can be achieved utilizing unique layering plus a mask combining methods used with texture-bombing procedural patterns to generate foreground+background patterns in layered succession.

FIG. 1 depicts details of a pattern generation process and synchronization system 100 for generating one or more patterns based on segmented areas in an image or video clip in accordance with examples of the present disclosure. A user 102 may generate, receive, acquire, or otherwise obtain a video clip 108. Subsequently, the user may select one or more texture patterns and/or one or more procedurally generated patterns to be added to or otherwise included in the video clip 108. The pattern generation process and synchronization system 100 allows the user 102 to apply the texture pattern and/or procedurally generated pattern to one or more layer masks created via object and/or area segmentations. In examples, a segmented object and/or area may follow one or more target body segments of a target subject in the video clip 108. Accordingly, different masks may be created based on different segmentation areas in the video; the patterns, generated as layers via texture or procedure, may then be applied to specific mask portions. The pattern generation process and synchronization system 100 may include the computing device 104 associated with the user 102 and/or a server that is communicatively coupled to the computing device 104 via a network. The network may include any kind of computing network including, without limitation, a wired or wireless local area network (LAN), a wired or wireless wide area network (WAN), and/or the Internet.

In examples, the user 102 may utilize the computing device 104 to acquire the video clip 108 and the specified pattern parameters. The user 102 may generate the video clip 108 using a camera communicatively coupled to a computing device 104. In such an example, the generated pattern may be applied to the video clip 108 in or near real-time to allow the user 102 to view the generated pattern effect as applied to one or more body portions, the foreground, and the background, and then provide an output video clip 112 as the user is taking the video on the computing device 104. Alternatively, or additionally, the user 102 may receive, acquire, or otherwise obtain the video clip 108 on the computing device 104. In some examples, the user 102 may edit the video clip 108 to add the generated pattern effect. In some aspects, the user 102 may utilize the computing device 104 to transmit the video clip 112 to the server via the network. The computing device 104 may be any one of a portable or non-portable computing device. For example, the computing device 104 may be a smartphone, a laptop, a desktop, a wearable electronic device, a smart home appliance, and a server. The video clip 108 may be acquired in any format and may be in a compressed and/or decompressed form.

The computing device 104 is configured to analyze each frame of the video clip 108 to identify body segments of one or more target subjects in the frame. For example, a body segmentation algorithm may define a list of body segments that are to be identified and extracted from the video clip 108. The body segments may include, but not limited to, head (e.g., hair, hat), facial (e.g., face, glasses, mask), torso skin, top (e.g., jacket, dress, coat, scarf), bottom (e.g., pants, shorts, skirts), hand (e.g., arm skin, gloves), and legs (e.g., leg skin, shoes, socks). In some examples, one or more body segments may be combined with other body segments to segment larger areas or objects. For example, clothes may be segmented, background may be segmented, foreground may be segmented, and/or hair of a target subject may be segmented.

The computing device 104 is configured to receive pattern generation parameters either configured by the user 102 or preset by the pattern generation process and synchronization system 100. Alternatively, in some aspects, the pattern generation parameters may be associated with segmented portions of the video clip. In some aspects, a segmentor/mask generator may generate the segmented areas or masks to be added to the video clip 108 or preset by the pattern generation process and synchronization system 100.

In some aspects, the user may choose a segmentation area or portion of the video clip 108 and generate a mask targeting one or more areas of the video clip such that a pattern, either texturally generated or procedurally generated, may be applied to the specified mask. Thus, using one or more layer parameters or scripts, a user or the pattern generation process and synchronization system 100 may specify for which portions or areas of the video clip masks are to be generated. Additionally, the parameters or scripts may further define a color, width, height, thickness, and brightness of a pattern to be applied to one or more masked areas. For example, orange may be assigned to the head, green may be assigned to the facial region, red may be assigned to the torso skin, turquoise may be assigned to the top, blue may be assigned to the pants, purple may be assigned to the hand, and pink may be assigned to the legs, yellow may be assigned to the background, and pink may be assigned to the foreground.

Additionally, the parameters or scripts may define a number of segmentation areas or masks to be generated. That is, the number of segmentation areas or masks may be associated with different portions of the subject (e.g., body) and/or different portions of the image or video (e.g., background, foreground, etc.). For example, five segmentation areas or masks may be generated for a video clip.

The computing device 104 is configured to add the pattern generation effect to the video clip 108 and present the video clip 112 to the user via a display of a computing device. It should be appreciated that the generation of the pattern, application of the pattern to one or more masks, and synthesis of the video may be performed and shown to the user at the display as the user is taking the video.

Figure 2:
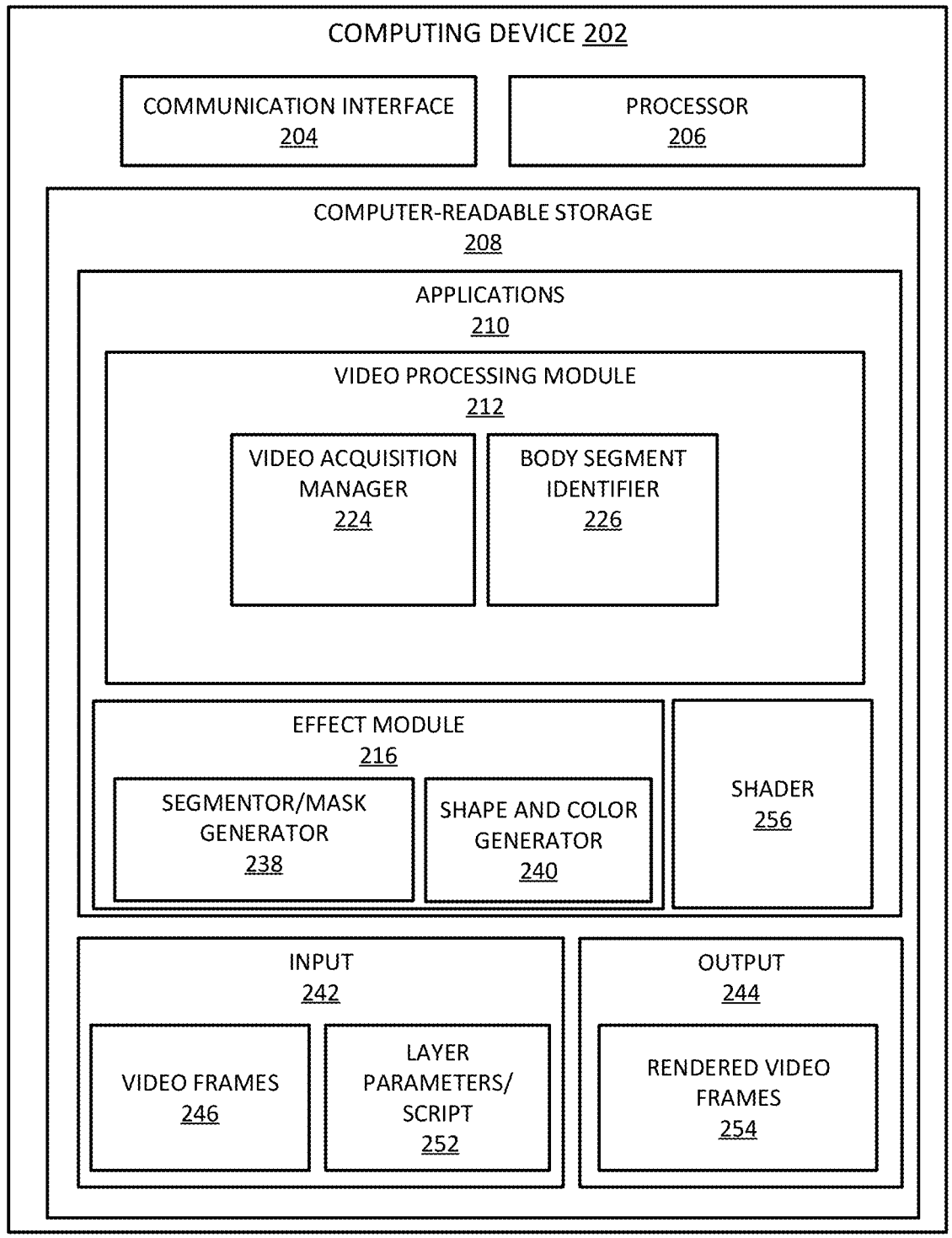
FIG. 2 depicts details of a computing device of the pattern generation process and synchronization system of FIG. 1 in accordance with examples of the present disclosure.

Referring now to FIG. 2, additional details of the computing device 202 are described in accordance with examples of the present disclosure. The computing device 202 may be the same as or similar to the computing device 104 previously described in FIG. 1. The computing device 202 may include a communication interface 204, a processor 206, and a computer-readable storage 208. In examples, the communication interface 204 may be coupled to a network and receive the video clip 108 and the pattern parameters/scripts. The video clip 108 (FIG. 1) may be stored as input 242 video frames 246 or images and the pattern parameters/scripts may be stored as layer parameters/script 252.

In some examples, one or more patterns may also be received at the communication interface 204 and stored in the layer parameters/script 252. As previously described, the layer parameters/script 252 may configure one or more parameters of a segmentor/mask generator 238 and/or shape and color generator 240. The layer parameters/script 252 may further define a color, width, height, thickness, and brightness of a mask for one or more portions of the video clip, as well as one or more patterns, either texturally generated or procedurally generated. Additionally, the layer parameters/script 252 may define a number of masks and/or a number of patterns for differing portions of the video or image to be added to the video clip.

In examples, one or more applications 210 may be provided by the computing device 104. The one or more applications 210 may include a video processing module 212, an effect module 216, and a shader 256. The video processing module 212 may include a video acquisition manager 224 and a body segment identifier 226. The video acquisition manager 224 is configured to receive, acquire, or otherwise obtain video data that includes one or more video frames. Additionally, the body segment identifier 226 is configured to identify one or more body segments of one or more target subjects in the frame. In the illustrative aspect, the target subject is a person. For example, a body segmentation algorithm may define a list of body segments that are to be identified and extracted from the video clip 108. The body segments may include, but not limited to, head (e.g., hair, hat), facial (e.g., face, glasses, mask), torso skin, top (e.g., jacket, dress, coat, scarf), bottom (e.g., pants, shorts, skirts), hand (e.g., arm skin, gloves), and legs (e.g., leg skin, shoes, socks). In some examples, the list of body segments may be received at the communication interface 204 and stored.

Furthermore, the effect module 216 may include a segmentor/mask generator 238 and a shape and/or color generator 240. The segmentor/mask generator 238 may follow one or more target body segments of a target subject in the video clip (e.g., video frames 246). For example, one or more body segments identified by the body segment identifier 226 may be utilized to segment one or more portions of a target subject and create a mask for such portion. Accordingly, different masks may be created based on different segmentation areas in the video. In accordance with examples of the present disclosure, the shape and/or color generator 240 may generate patterns of various colors, shapes, sizes, movement, etc. and provide such pattern to the shader 256. In examples, the shape and color generator 240 may receive user input, such as layer parameters/script 252, and use such input to generate or select a pattern. Alternatively, or in addition, the shape and color generator 240 may randomly generate patterns, colors, and/or shapes, and/or may select shapes, colors, and/or patterns in accordance with one or more objects detected in the video frames 246 and/or one or more masks that may be present as determined by the segmentor/mask generator 238. Thus, the shader 256 may receive one or more masks from the mask generator 238; such mask may be provided as a single mask where different portions of the mask are differentiated via color (such as an RGBA mask). In some examples, the shader 256 may procedurally generate patterns according to the layer parameters/script 252 and/or the shape and color generator 240. The texturally and/or procedurally generated patterns may be generated as different layers; accordingly, each of the different layers may be assigned to or otherwise applied to one or more of the masks or portions of the mask when a mask includes a plurality of differentiated areas. The generated pattern may then be applied to the one or more video images to render video frames 254 as an output 244 of the computing device 202.

Figure 3:
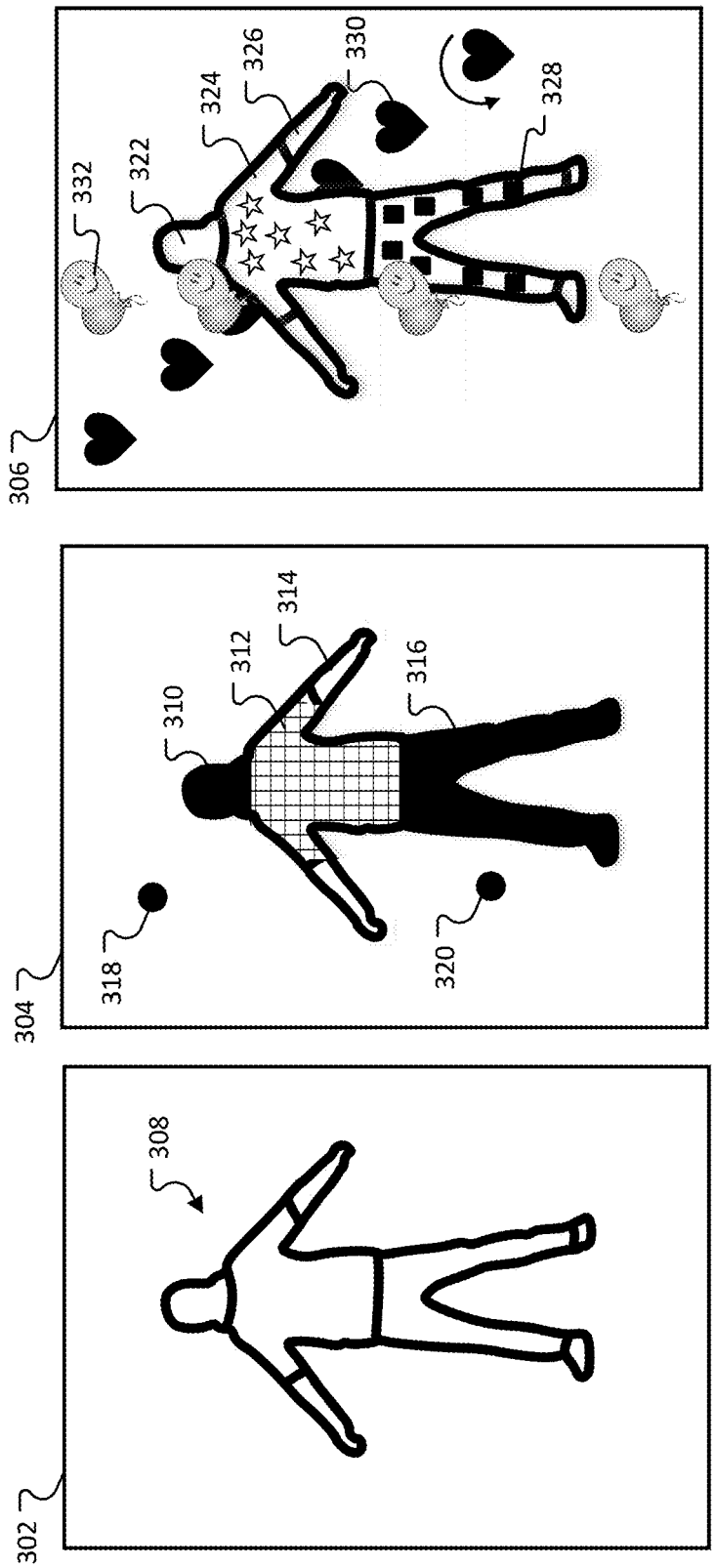
FIG. 3 depicts exemplary video frames illustrating the generation of masks and the application of generated patterns to the generated masks in accordance with examples of the present disclosure.

FIG. 3 depicts exemplary video frames 302, 304, and 306 for purposes of explaining the generation of masks and application of generated patterns to the generated masks in accordance with examples of the present disclosure. In examples, the video frame 302 represents a video frame received by the pattern generation process and synchronization system 100 for example. The video frame 302 may include a subject or user 308. The video frame 302 may be subjected to segmentation processing such that one or more masks or segments of the video are identified. In examples, the video frame 304 depicts an illustrative example of the segmented frame 304. For example, the frame 304 may be segmented into a head mask portion 310, a shirt mask portion 312, an arm skin mask portion 314, and a pants mask portion 316. Further, the background may be segmented or identified as 318 and the foreground as 320. In examples of the present disclosure, a first pattern 322 may be applied to the head mask portion 310, a second pattern 324 may be applied to the shirt mask portion 312, a third pattern 326 may be applied to the arm skin mask portion 314, a fourth pattern 328 may be applied to the pants mask portion 316, a fifth pattern 330 may be applied to the background portion 318, and a sixth pattern 322 may be applied to the foreground portion 320. In examples, the foreground 320 may be in front of the other portions or masks; accordingly, the pattern 332 may appear to be in front of the other objects or portions in the video. Similarly, the background portion 318 may be behind the other portions or masks; accordingly, the pattern 330 may be applied behind such that it appears to be behind other objects or portions of the video. As further depicted in the vide frame 306, one or more of the patterns 322-332 may rotate, change direction, change color, change size, change shape, etc. over time.

Figure 4:
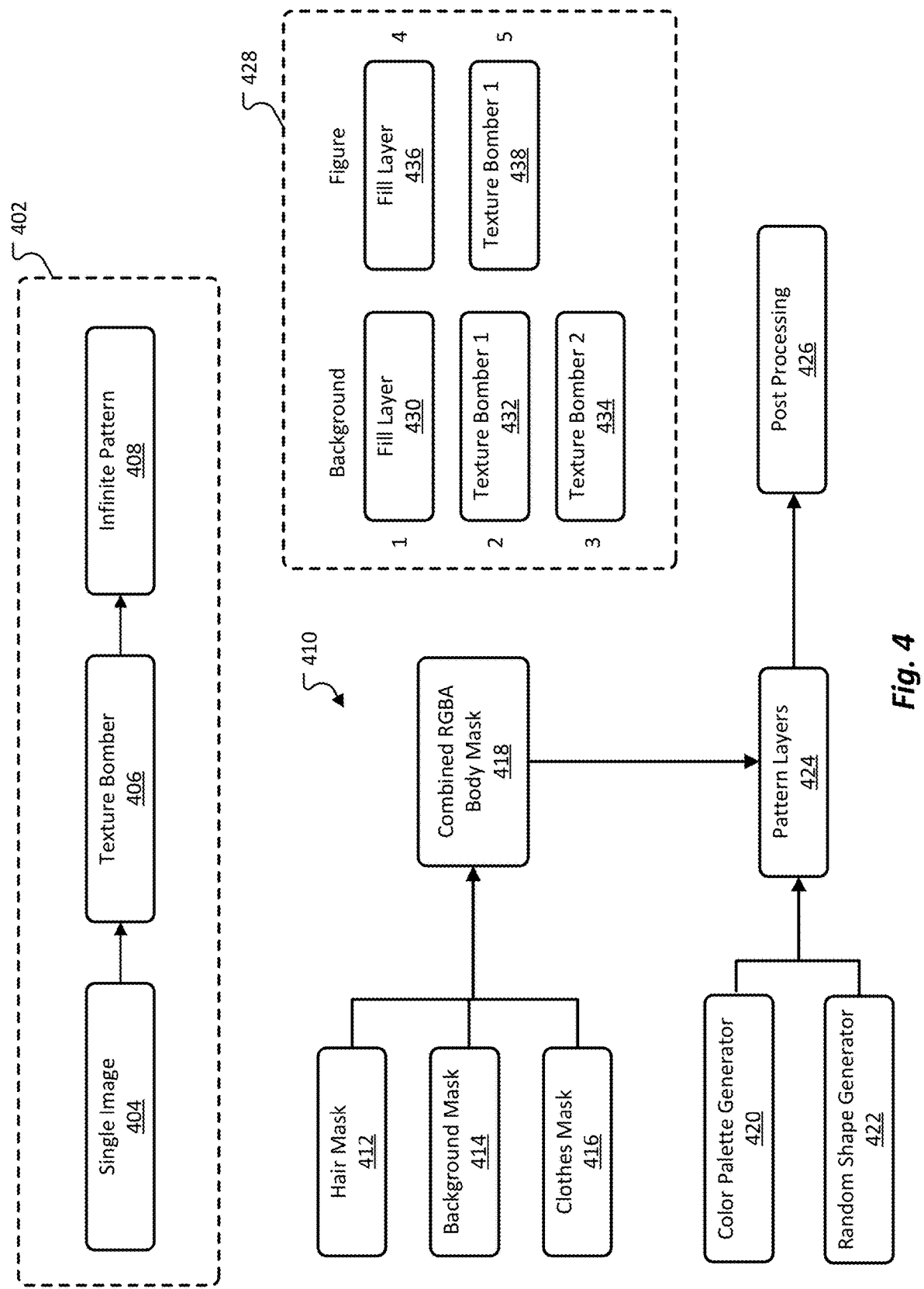
FIG. 4 describes additional details of the infinite pattern generation process, the pattern and mask combination process, and example layers of a video in accordance with examples of the present disclosure.

FIG. 4 describes additional details of the infinite pattern generation process 402, the pattern and mask combination process 410, and example layers of a video 428 in accordance with examples of the present disclosure. In examples, a single image 404 may be received in accordance with layer parameter/script 252; the single image 404 may be subjected to a texture bomber process 406 such that an infinite pattern 408 may be generated. Such a procedure, as depicted in 402, may be referred to as texture sampling or generation. Alternately, or in addition, the shader may generate a pattern or image procedurally such that the texture bomber 406 applies the texture bombing process to the procedurally generated pattern to generate the infinite pattern 408. Regardless, the infinite pattern 408 may exist or otherwise be assigned to one or more layers of a video.

The pattern and mask combination process 410 may combine the generated pattern layers 424 with the mask as previously described. For example, segmentor/mask generator may provide a hair mask 412, background mask 414, and/or a clothes mask 416. In some examples, the plurality of masks 412, 414, and/or 416 may be combined into a single RGBA mask at 418 for example. Alternatively, or in addition, the plurality of masks may remain specific to each portion or area of a video clip or image. The mask(s) may then be combined with the pattern layers at 424; in examples, the pattern layers may be generated in accordance with 402 above and/or may be generated randomly for example, using a color palette generator 420 and/or a random shape generator 422. Accordingly, the pattern layers 424 and the RGBA body mask may be combined (e.g., via multiplication or dot multiplication for example) to generate a pattern application effect. In examples, the pattern application effect may then be applied to the video at a post processing step 426.

FIG. 4 further depicts a plurality of layers 428 for purposes of explaining one or more layers utilized throughout the pattern application effect process. In examples, a plurality of background layers (e.g., fill layer 430, texture bomber 1 layer 432, and/or texture bomber 2 layer 434) may be determined, specified, or otherwise identified based on user input, preselected values, and/or contents present in a video image or clip. Similarly, layers pertaining to or otherwise associated with the figure or subject in a video image or clip may include a fill layer 436 and/or a texture bomber 1 layer 438. Of course more or fewer layers may be included in the plurality of layers and in some instances, such layers may be grouped in a different manner other than being or otherwise associated with a background layer or a figure layer.

Figure 5:
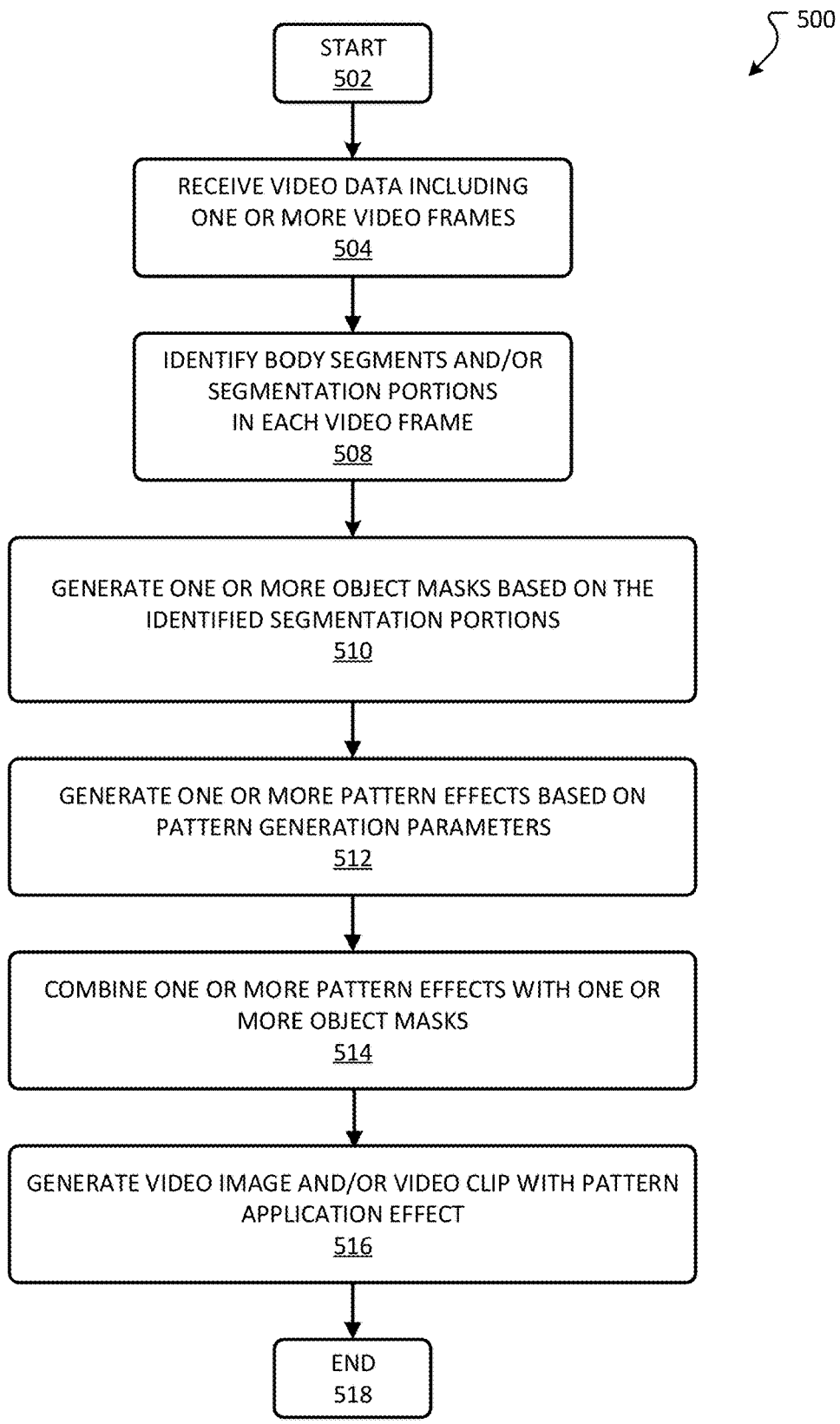
FIG. 5 depicts details of a simplified method for rendering one or more pattern application effects to video data based on texture or procedurally generated content in accordance with examples of the present disclosure.

Referring now to FIG. 5, a simplified method for rendering one or more pattern application effects to video data based on texture or procedurally generated content is described in accordance with examples of the present disclosure. A general order for the steps of a method 500 is shown in FIG. 5. Generally, the method 500 starts at 502 and ends at 518. The method 500 may include more or fewer steps or may arrange the order of the steps differently than those shown in FIG. 5. The method 500 can be executed as a set of computer-executable instructions executed by a computer system and encoded or stored on a computer readable medium. In the illustrative aspect, the method 500 is executed by a computing device associated with a user (e.g., 102). However, it should be appreciated that aspects of the method 500 may be performed by one or more processing devices, such as a computer or server (e.g., 104). Further, the method 500 can be performed by gates or circuits associated with a processor, Application Specific Integrated Circuit (ASIC), a field programmable gate array (FPGA), a system on chip (SOC), a neural processing unit, or other hardware device. Hereinafter, the method 500 shall be explained with reference to the systems, components, modules, software, data structures, user interfaces, etc. described in conjunction with FIGS. 1-4.

The method 500 starts at 502, where flow may proceed to 504. At 504, the computing device receives video data (e.g., video image or video clip 108) including one or more video frames. For example, a user 102 may generate, receive, acquire, or otherwise obtain a video clip 108 via the computing device. At 508, the computing device processes each frame of the video data to identify body segments of one or more target subjects in the frame. For example, a body segmentation algorithm may define a list of body segments that are to be identified and extracted from the video clip 108. The body segments may include, but not limited to, head (e.g., hair, hat), facial (e.g., face, glasses, mask), torso skin, top (e.g., jacket, dress, coat, scarf), bottom (e.g., pants, shorts, skirts), hand (e.g., arm skin, gloves), and legs (e.g., leg skin, shoes, socks). In the illustrative aspect, a list of the body segments may be defined by the body segmentation algorithm.

At 510, one or more object masks may be generated based on the identified body segments of the one or more target subjects in the frame. For example, the segmentor/mask generator 238 may generate the segmented areas or masks to be added to the video clip 108 or preset by the pattern generation process and synchronization system 100.

In some aspects, the user may choose a segmentation area or portion of the video clip 108 and generate a mask targeting one or more areas of the video clip such that a pattern, either texturally generated or procedurally generated, may be applied to the specified mask. Thus, using one or more layer parameters or scripts, a user or the pattern generation process and synchronization system 100 may specify for which portions or areas of the video clip masks are to be generated. At 512, one or more pattern effects may be generated based on the pattern generation parameters/scripts. That is, the parameters or scripts may further define a color, width, height, thickness, and brightness of a pattern to be applied to one or more masked areas. For example, orange may be assigned to the head, green may be assigned to the facial region, red may be assigned to the torso skin, turquoise may be assigned to the top, blue may be assigned to the pants, purple may be assigned to the hand, and pink may be assigned to the legs, yellow may be assigned to the background, and pink may be assigned to the foreground.

Additionally, the parameters or scripts may define a number of segmentation areas or masks to be generated at 510 and/or patterns to be generated at 512. That is, the number of segmentation areas or masks may be associated with different portions of the subject (e.g., body) and/or different portions of the image or video (e.g., background, foreground, etc.). For example, five segmentation areas or masks may be generated for a video clip. At 514, the one or more pattern effects may be combined with one or more object masks to generate the pattern application effect. That is, the object masks can be combined into a single mask, such as an RGBA mask, to increase efficiency and ease of use. Accordingly, a portion of the mask (such as a portion associated with an object in the video image or video clip) can be selected in order to apply a generated pattern for a specific layer to the selected portion or layer.

In examples, the generated pattern layers may be arranged to utilize a number of fill background and texture bomber layers in the background (e.g., not the subject of the video or image); a texture bombing layer can be applied to the subject of video or image. In examples, the fill may include a tiled texture; the texture bomber may generate elements that compose or create the generated pattern. The layers may then be combined using an alpha+render order, one after the other, so that each successive layer appears on top of the previous layer. The figure+background may be differentiated by a bitmask that is multiplied against the RGBA subject or body mask to hide parts of the background or subject in the image. At 516, a video image and/or video clip including the pattern application effect may be rendered and provided as output to a display device of a user.

Figure 6:
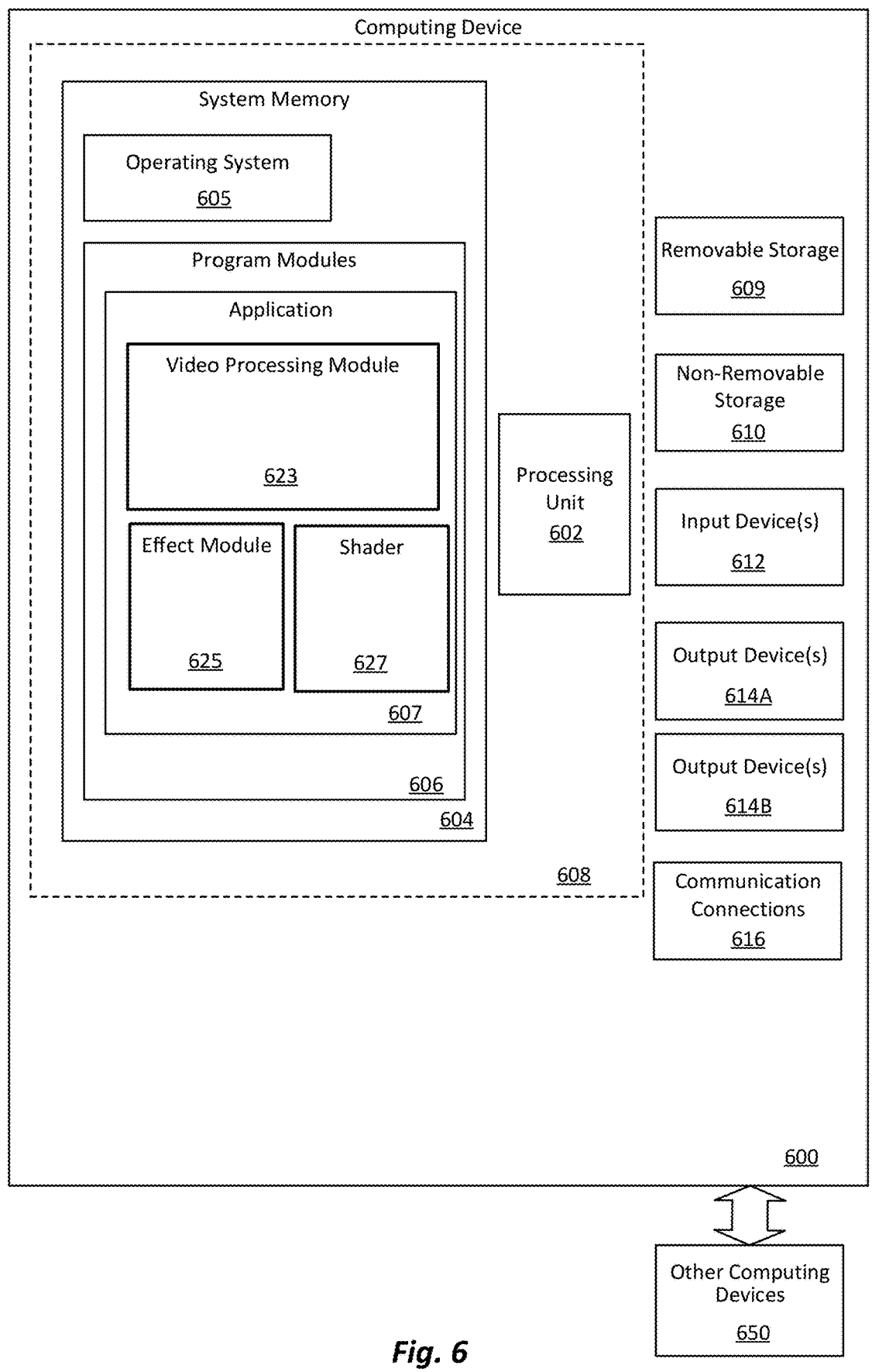
FIG. 6 depicts a block diagram illustrating physical components (e.g., hardware) of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above. For example, the computing device 600 may represent the computing device 104 of FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, several program modules and data files may be stored in the system memory 604. While executing on the at least one processing unit 602, the application 607 or the program modules 606 may perform processes including, but not limited to, one or more aspects, as described herein. The application 620 includes a video processing module 623, an effect module 625, and a shader 627, as described in more detail with regard to FIG. 1. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614A such as a display, speakers, a printer, etc. may also be included. An output 614B, corresponding to a virtual display may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
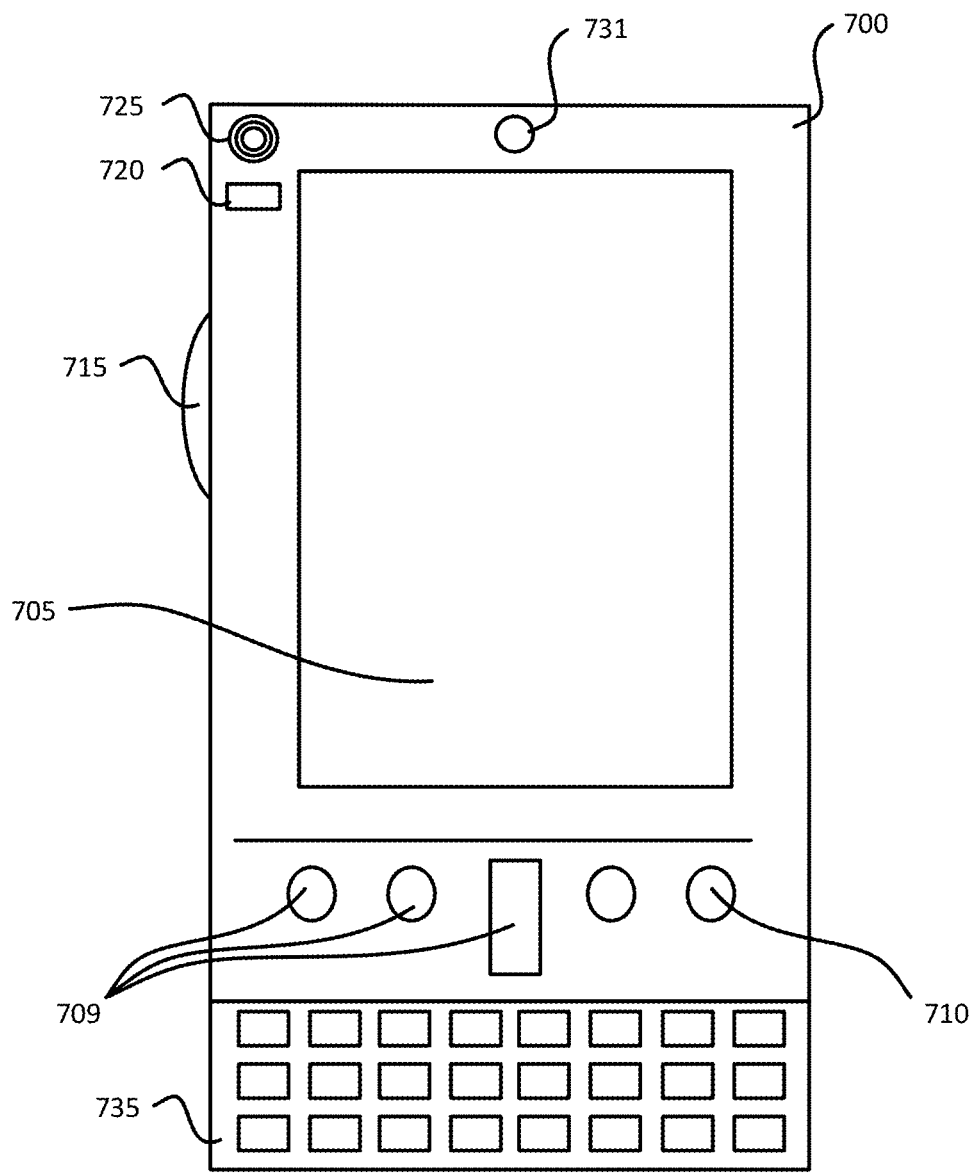
FIG. 7A illustrates a first example of a computing device with which aspects of the disclosure may be practiced.
Figure 7B:
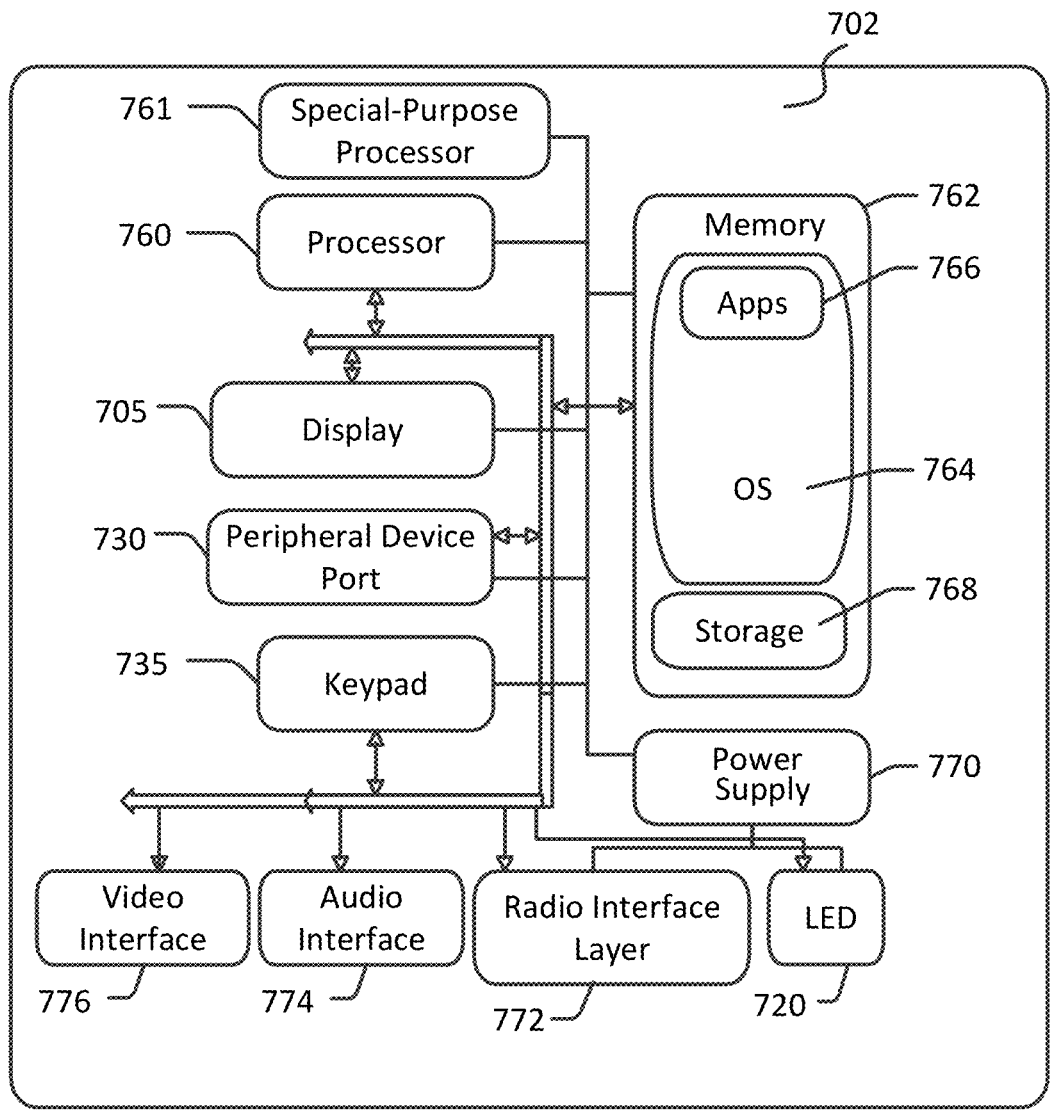
FIG. 7B illustrates a second example of a computing device with which aspects of the disclosure may be practiced.

FIGS. 7A and 7B illustrate a computing device or mobile computing device 700 suitable for performing the various aspects disclosed herein, for example, a mobile telephone, a smart phone, wearable computer (such as a smart watch), a tablet computer, a laptop computer, a smart home appliance, and the like, with which aspects of the disclosure may be practiced. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 709/710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 731 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports 730, such as an audio input (e.g., a microphone jack), an audio output (e.g., a headphone jack), and a video output (e.g., a HDMI port) for sending signals to or receiving signals from an external source.

FIG. 7B is a block diagram illustrating the architecture of one aspect of computing device, a server, or a mobile computing device. That is, the mobile computing device 700 can incorporate a system (702) (e.g., an architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and/or one or more components supported by the systems described herein. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g. a video processing module 623, an effect module 625, and a shader 627, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760/761 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of an on-board camera to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 668.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
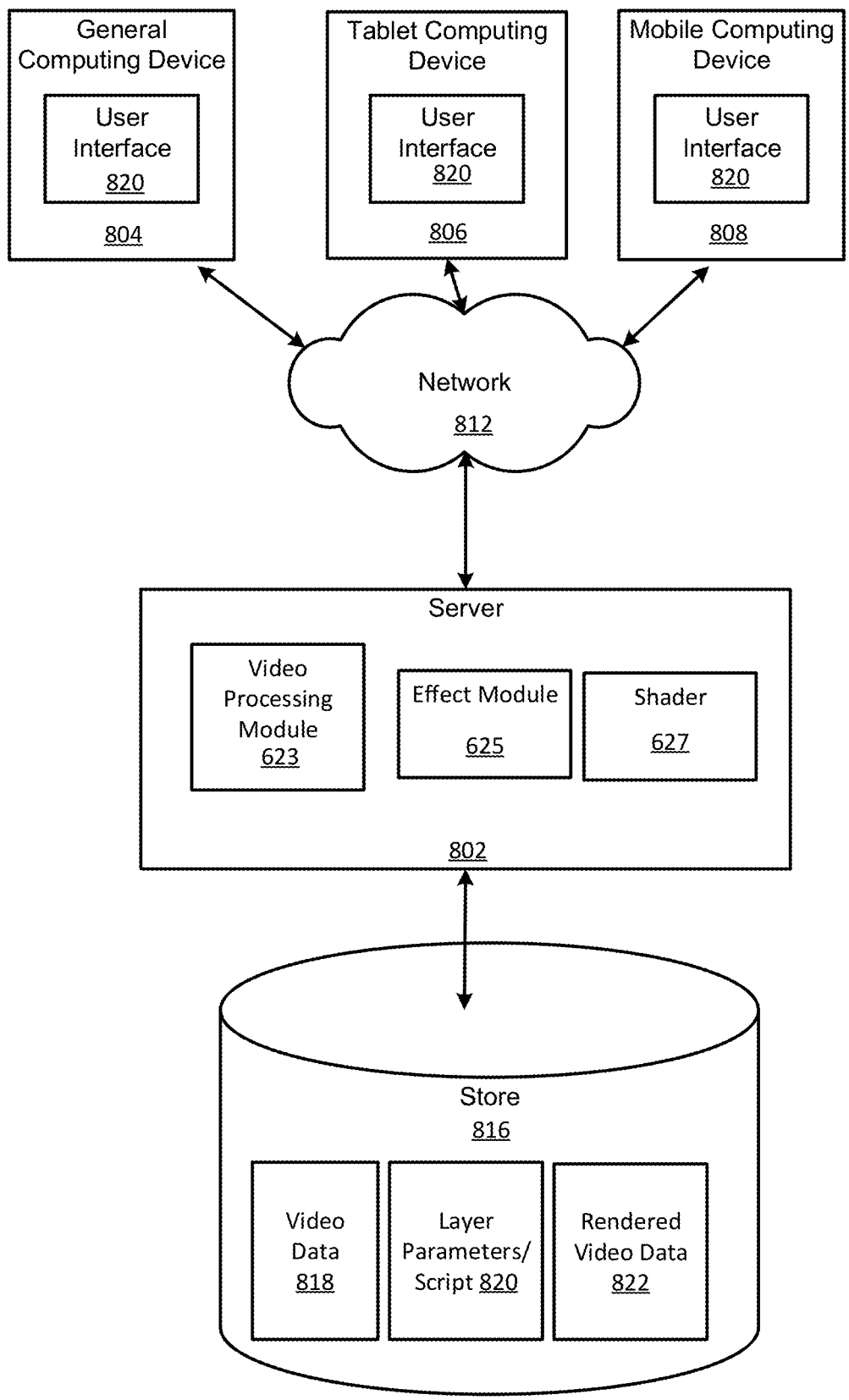
FIG. 8 illustrates at least one aspect of an architecture of a system for processing data in accordance with examples of the present disclosure.

FIG. 8 illustrates one aspect of the architecture of a system for processing data received at a computing system, suitable for performing the various aspects disclosed herein, from a remote source, such as a personal computer 804, tablet computing device 806, or mobile computing device 808, as described above. Content displayed at server device 802 may be stored in different communication channels or other storage types. For example, the computing device 804, 806, 808 may represent the computing device 104 of FIG. 1, and the server device 802 may represent a computing device, such as the computing device 104 of FIG. 1.

In some aspects, one or more of a video processing module 623, effect module 625, and shader 627, may be employed by server device 802. The server device 802 may provide data to and from a client computing device such as a personal computer 804, a tablet computing device 806 and/or a mobile computing device 808 (e.g., a smart phone) through a network 812. By way of example, the computer system described above may be embodied in a personal computer 804, a tablet computing device 806 and/or a mobile computing device 808 (e.g., a smart phone). Any of these aspects of the computing devices may obtain content from the store 816, in addition to receiving graphical data useable to be either pre-processed at a graphic-originating system, or post-processed at a receiving computing system. The content store 816 may include video data 818, layer parameters/script 820, and/or rendered video data 822 that include the pattern application effect as described herein.

FIG. 8 illustrates an exemplary mobile computing device 808 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for applying a pattern application effect to one or more frames of video according to at least the examples provided in the sections below:

(A1) In one aspect, some examples include a method for applying a pattern application effect to one or more frames of video. The method may include: obtaining, by a computing device, video data including one or more video frames, determining, by the computing device, one or more segments in each of the one or more video frames, determining, by the computing device, one or more object masks based on the one or more segments in each of the one or more video frames, combining, by the computing device, the one or more object masks into a single mask, the single masking representing the one or more object masks, obtaining pattern information, the pattern information representing one or more graphical effects to be applied to at least one layer of the one or more video frames, applying the pattern information to the single mask to generate masked pattern information and generating, by the computing device, a rendered video by adding the masked pattern information to the one or more video frames.

(A2) In some examples of A1, the pattern information includes at least one of texture information or procedurally generated content.

(A3) In some examples of A1-A2, the pattern information includes a plurality of graphical effects for a plurality of layers of the one or more video frames.

(A4) In some examples of A1-A3, the pattern information includes at least one of shape content, color content, movement information, and/or size information for graphical elements.

(A5) In some examples of A1-A4, the single mask includes a plurality of different colors, each color of the plurality of different colors representing at least one object mask of the one or more object masks.

(A6) In some examples of A1-A5, the method further includes: generating a first pattern including pattern information representing one or more graphical effects to be applied to the at least one layer of the one or more video frames, the generated pattern being a randomly generated pattern.

(A7) In some examples of A1-A6, the method further includes: applying a texture bombing process to generate pattern information.

(A8) In some examples of A1-A7, the pattern information is received at a shader and the shader processes the pattern information and generates the one or more graphical effects.

In yet another aspect, some examples include a computing system including one or more processors and memory coupled to the one or more processors, the memory storing one or more instructions which when executed by the one or more processors, causes the one or more processors perform any of the methods described herein (e.g., A1-A8 described above).

In yet another aspect, some examples include a non-transitory computer-readable storage medium storing one or more programs for execution by one or more processors of a storage device, the one or more programs including instructions for performing any of the methods described herein (e.g., A1-A8 described above).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for applying a pattern application effect to one or more frames of video, the method comprising:
   obtaining, by a computing device, video data including one or more video frames;
   determining, by the computing device, a plurality of segments in each of the one or more video frames, the plurality of segments comprising body segments of a subject in the one or more video frames;
   determining, by the computing device, a plurality of object masks based on the plurality of segments in each of the one or more video frames;
   combining, by the computing device, the plurality of object masks into a single mask, the single mask representing the plurality of object masks;
   obtaining pattern information, the pattern information representing a plurality of graphical effects to be applied to a plurality of layers of the one or more video frames, the plurality of layers corresponding to the plurality of object masks;
   applying the pattern information for the plurality of graphical effects to the single mask in layered succession to generate masked pattern information for the plurality of layers; and
   generating, by the computing device, a rendered video by adding the masked pattern information to the one or more video frames.

2. The method of claim 1, wherein the pattern information includes at least one of texture information or procedurally generated content.

3. The method of claim 1 wherein the pattern information includes at least one of shape content, color content, movement information, and/or size information for graphical elements.

4. The method of claim 1, wherein the single mask includes a plurality of different colors, each color of the plurality of different colors representing at least one object mask of the plurality of object masks.

5. The method of claim 1, further comprising generating a first pattern including pattern information representing one or more graphical effects to be applied to the plurality of layers of the one or more video frames, the generated pattern being a randomly generated pattern.

6. The method of claim 1, further comprising applying a texture bombing process to generate the pattern information.

7. The method of claim 1, wherein the pattern information is received at a shader, wherein the shader processes the pattern information and generates the plurality of graphical effects.

8. The method of claim 1, wherein applying the pattern information comprises:
for each object mask of the plurality of object masks:
selecting a portion of the single mask corresponding to the object mask; and
applying a generated pattern for a specific layer of the plurality of layers to the selected portion of the single mask to generate a layer of the plurality of layers.

9. The method of claim 8, wherein:
the single mask is a Red Green Blue Alpha (RGBA) mask; and
generating the rendered video comprises combining the generated layers using an alpha portion of the RGBA mask plus a render order for the plurality of layers.

10. A system comprising:
one or more hardware processors configured by machine-readable instructions to:
obtain video data including one or more video frames;
determine a plurality of segments in each of the one or more video frames, the plurality of segments comprising body segments of a subject in the one or more video frames;
determine a plurality of object masks based on the plurality of segments in each of the one or more video frames;
combine the plurality of object masks into a single mask, the single mask representing the plurality of object masks;
obtain pattern information, the pattern information representing a plurality of graphical effects to be applied to a plurality of layers of the one or more video frames, the plurality of layers corresponding to the plurality of object masks;
apply the pattern information for the plurality of graphical effects to the single mask in layered succession to generate masked pattern information for the plurality of layers; and
generate a rendered video by adding the masked pattern information to the one or more video frames.

11. The system of claim 10, wherein the pattern information includes at least one of texture information or procedurally generated content.

12. The system of claim 10, wherein the pattern information includes at least one of shape content, color content, movement information, and/or size information for graphical elements.

13. The system of claim 10, wherein the single mask includes a plurality of different colors, each color of the plurality of different colors representing at least one object mask of the plurality of object masks.

14. The system of claim 10, wherein the one or more hardware processors are further configured by machine-readable instructions to: generate a first pattern including pattern information representing one or more graphical effects to be applied to the plurality of layers of the one or more video frames, the generated pattern being a randomly generated pattern.

15. The system of claim 10, wherein the one or more hardware processors are further configured by machine-readable instructions to: apply a texture bombing process to generate the pattern information.

16. The system of claim 10, wherein the pattern information is received at a shader, wherein the shader processes the pattern information and generates the plurality of graphical effects.

17. A non-transitory computer-readable storage medium comprising instructions, which when executed by one or more processors, cause the one or more processors to:
obtain video data including one or more video frames;
determine a plurality of segments in each of the one or more video frames, the plurality of segments comprising body segments of a subject in the one or more video frames;
determine a plurality of object masks based on the plurality of segments in each of the one or more video frames;
combine the plurality of object masks into a single mask, the single masking representing the plurality of object masks;
obtain pattern information, the pattern information representing a plurality of graphical effects to be applied to the plurality of layers of the one or more video frames, the plurality of layers corresponding to the plurality of object masks;
apply the pattern information for the plurality of graphical effects to the single mask in layered succession to generate masked pattern information for the plurality of layers; and
generate a rendered video by adding the masked pattern information to the one or more video frames.

18. The computer-readable storage medium of claim 17, wherein the pattern information includes at least one of texture information or procedurally generated content.

19. The computer-readable storage medium of claim 17, wherein:
the pattern information includes at least one of shape content, color content, movement information, and/or size information for graphical elements; and
the single mask includes a plurality of different colors, each color of the plurality of different colors representing at least one object mask of the one or more object masks.

* * * * *